United States Patent
Kim

(10) Patent No.: US 8,717,615 B2
(45) Date of Patent: May 6, 2014

(54) METHOD AND APPARATUS FOR REQUESTING PRINTING OF PANORAMIC IMAGE IN MOBILE DEVICE

(75) Inventor: Dae-hyun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1271 days.

(21) Appl. No.: 11/677,229

(22) Filed: Feb. 21, 2007

(65) Prior Publication Data

US 2007/0273767 A1 Nov. 29, 2007

Related U.S. Application Data

(60) Provisional application No. 60/791,421, filed on Apr. 13, 2006.

(30) Foreign Application Priority Data

May 12, 2006 (KR) .................. 10-2006-0043130

(51) Int. Cl.
*G06K 15/00* (2006.01)
(52) U.S. Cl.
USPC ........... 358/1.18; 358/1.9; 358/450; 358/535; 358/537; 358/540
(58) Field of Classification Search
CPC ...... G06F 3/12; G06K 15/00; H04N 1/00442; H04N 7/2667; H04N 1/00466
USPC ................................. 358/1.1–1.18
See application file for complete search history.

(56) References Cited

U.S. PATENT DOCUMENTS

| | | |
|---|---|---|
| 2003/0001013 A1 | 1/2003 | Akamine |
| 2003/0002056 A1 | 1/2003 | Yamaguchi et al. |
| 2003/0177444 A1 | 9/2003 | Sunata |
| 2003/0231346 A1 | 12/2003 | Tagawa |
| 2004/0252332 A1* | 12/2004 | McCoog et al. ............ 358/1.15 |
| 2005/0278619 A1* | 12/2005 | Kim et al. .................. 715/513 |
| 2006/0093195 A1* | 5/2006 | Fox ............................. 382/128 |
| 2007/0024909 A1* | 2/2007 | Hanechak ................... 358/1.18 |

FOREIGN PATENT DOCUMENTS

| | | |
|---|---|---|
| EP | 1 408 424 A2 | 4/2004 |
| JP | 2000-330186 | 11/2000 |
| JP | 2002-185952 | 6/2002 |
| JP | 2003-054066 | 2/2003 |

(Continued)

OTHER PUBLICATIONS

English Machine Translation of JP Pub No. 11-017998, Jan. 22, 1999, Image Pickup Device Controller by Tamayama et al.*

(Continued)

*Primary Examiner* — Benny Q Tieu
*Assistant Examiner* — Marcellus Augustin
(74) *Attorney, Agent, or Firm* — Staas & Halsey LLP

(57) ABSTRACT

Provided is a method and apparatus to request that an image be printed, where the image is stored in a mobile device, such as a cellular phone, which is able to capture the image. The method includes creating a markup document indicating a panoramic image in which a plurality of images are united, and requesting that the panoramic image be printed, by transmitting the created markup document. Accordingly, a panoramic image may be easily created even in a mobile device having an insufficient memory resource and low specification hardware.

27 Claims, 8 Drawing Sheets

(56) References Cited

FOREIGN PATENT DOCUMENTS

| | | |
|---|---|---|
| JP | 2003-273971 | 9/2003 |
| JP | 2003-281523 | 10/2003 |
| JP | 2004-086848 | 3/2004 |
| WO | WO 2005/121943 | 12/2005 |
| WO | WO 2005/121943 A1 | 12/2005 |

OTHER PUBLICATIONS

Grant, Melissa and Jim Bieglow, Eds. "XHTML-Print: W3C Proposed Recommendation Jan. 31, 2006." 2006 (45 pp).

Search Report issued in International Application No. PCT/KR2007/001203 on May 30, 2007.
Written Opinion issued in International Application No. PCT/KR2007/001203 on May 30, 2007.
Office Action issued by Korean Intellectual Property Office in Korean Patent Application No. 2006-43130 on Aug. 28, 2007.
Japanese Office Action mailed Sep. 28, 2010 in related Japanese Application No. 2009-505274 (3 pages) English Translation (2 pages).
Chinese Second Office Action dated May 24, 2011 in Chinese Patent Application No. 200780012915.2.

\* cited by examiner

FIG. 6

```
<?xml version="1.0" encoding="utf-8"?>
<!DOCTYPE html PUBLIC "-//W3C//DTD XHTML-Print 1.0//EN"
"http://www.w3.org/MarkUp/DTD/xhtml-print10.dtd">
<html xmlns="http://www.w3.org/1999/xhtml">
<head>
<style type="text/css">
@page { size: 4in 6in landscape; margin: 0in; }
img { position: relative; }
body { padding: 0;}
.centerAlign {position: absolute; top:0.53in; left:0.93in; }
.rowBox { position: relative; width: 4.14in; height: 1.47in; overflow:hidden;}
.columnLoc0 { position: absolute; left:0in; width: 2.07in;}
.columnLoc1 { position: absolute; left: 2.07in; width: 2.07in;}
.locationLT { position: relative; left:-0.5in; top: -0.2in; width:2.13in; height: 1.59in; }
.locationRT { position: relative; left:-0.2in; top: -0.1in; width: 2.13in; height: 1.59in; }
.locationLB { position: relative; left:-0.3in; top: -0.35in;width: 2.13in; height: 1.59in; }
.locationRB { position: relative; left:0in; top: -0.3in; width: 2.13in; height: 1.59in; }
</style>
</head>
<body>
    <div class="centerAlign">
        <div class="rowBox">
            <div class="columnLoc0">
                <img class="locationLT" src="panorama1.jpg" alt="" />
            </div>
            <div class="columnLoc1">
                <img class="locationRT" src="panorama2.jpg" alt="" />
            </div>
        </div>
        <div class="rowBox">
            <div class="columnLoc1">
                <img class="locationLB" src="panorama3.jpg" alt="" />
            </div>
            <div class="columnLoc1">
                <img class="locationRB" src="panorama4.jpg" alt="" />
            </div>
        </div>
    </div>
</body>
</html>
```

① CLIPPING FUNCTION
② ZOOM FUNCTION
③ MOVEMENT FUNCTION

METHOD AND APPARATUS FOR REQUESTING PRINTING OF PANORAMIC IMAGE IN MOBILE DEVICE

CROSS-REFERENCE TO RELATED APPLICATIONS

This application claims the benefit of U.S. Provisional Application No. 60/791,421, filed on Apr. 13, 2006 and Korean Application No. 2006-43130, filed May 12, 2006 in the Korean Intellectual Property Office, the disclosures of which are incorporated herein by reference.

BACKGROUND OF THE INVENTION

1. Field of the Invention

Aspects of the present invention relate to a method and an apparatus for requesting that an image be printed, where the image is in a mobile device, such as a cellular phone, which is able to capture the image.

2. Description of the Related Art

FIG. 1 illustrates photographs having a panoramic format, which are formed using consecutive images, according to conventional methods. As shown in FIG. 1, a first conventional method of forming consecutive images is one of the simplest methods available and comprises obtaining a panoramic photograph by printing consecutive images and positioning the printouts together in their proper order (as shown in a printout 1A). However, in practice, this method is inconvenient since joint portions of the photographed images must be positioned correctly. Further, a partial mismatch of the obtained panoramic photograph may occur according to a joint status of the photographed images.

A second conventional method of forming consecutive images comprises uniting several images to a single image before printing, as shown in image 1B of FIG. 1. FIG. 2 is a block diagram of a conventional panoramic image printing apparatus which realizes the second conventional method shown in FIG. 1B. As shown in FIG. 2, the conventional panoramic image printing apparatus includes an image viewer 21, an image adjuster 22, an image uniting unit 23, an image clipper 24, and a panoramic image printing unit 25.

The image viewer 21 displays source images of a panoramic image. The image adjuster 22 moves the source images in horizontal/vertical directions and performs zooming operations for the source images to generate a panoramic image. The image uniting unit 23 creates a single united image using the source images adjusted by the image adjuster 22. The image clipper 24 creates a panoramic image having a user desired size by clipping the image united by the image uniting unit 23. The panoramic image printing unit 25 prints the panoramic image clipped by the image clipper 24.

Although a relatively correct joint may be performed when the source images are united in the second conventional method shown in FIG. 1B as compared to the first conventional method shown in FIG. 1A, the second method shown in FIG. 1B has a problem in that a partial mismatch of a panoramic image may occur and an image modification process, such as clipping of images to a specific size, must be performed to unite the images. In particular, the second method shown in FIG. 1B requires a memory resource that is double the total image file size to perform the image modification process. Thus, a panoramic image cannot be easily created using a mobile device having an insufficient memory resource and low specification hardware.

SUMMARY OF THE INVENTION

Aspects of the present invention provide a method and apparatus for easily creating a panoramic image even in a mobile device having an insufficient memory resource and low specification hardware. Aspects of the present invention also provide a computer readable recording medium having a computer readable program stored thereon to execute the method.

According to an aspect of the present invention, there is provided a print requesting method comprising: creating a markup document indicating a panoramic image in which a plurality of images are united; and requesting that the panoramic image be printed, by transmitting the created markup document.

According to another aspect of the present invention, there is provided a computer readable recording medium having a computer readable program stored thereon to execute the print requesting method.

According to another aspect of the present invention, there is provided a print requesting apparatus comprising: an adjuster to create a markup document indicating a panoramic image by adjusting a layout of the panoramic image; and a transmitter to request that the panoramic image be printed, by transmitting the markup document.

According to another aspect of the present invention, there is provided a printing method comprising: receiving a markup document indicating a panoramic image in which a plurality of images are united; analyzing the received markup document; and printing a result of the analysis.

According to another aspect of the present invention, there is provided a computer readable recording medium having a computer readable program stored thereon to execute the printing method.

According to another aspect of the present invention, there is provided a printing apparatus comprising: a receiver to receive a markup document indicating a panoramic image in which a plurality of images are united; an analyzer to analyze the received markup document; and a print engine to print a result of the analysis.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates an extensible hyper text markup language (XHTML)-Print document according to an embodiment of the present invention;

DETAILED DESCRIPTION OF THE EMBODIMENTS

Figure 1:
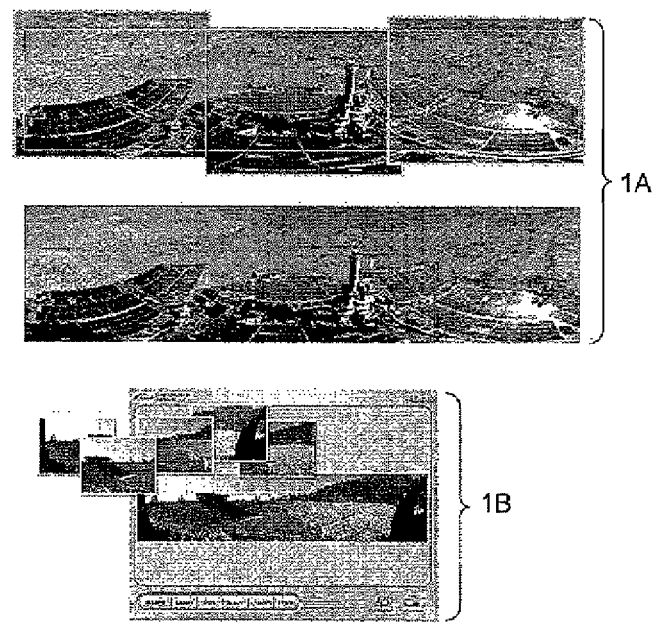
FIG. 1 illustrates photographs of a panoramic format, which are formed using consecutive images, according to conventional methods.
Figure 2:
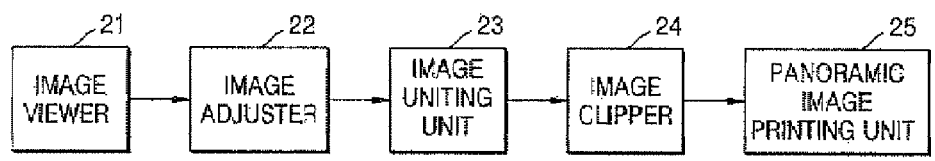
FIG. 2 is a block diagram of a conventional panoramic image printing apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
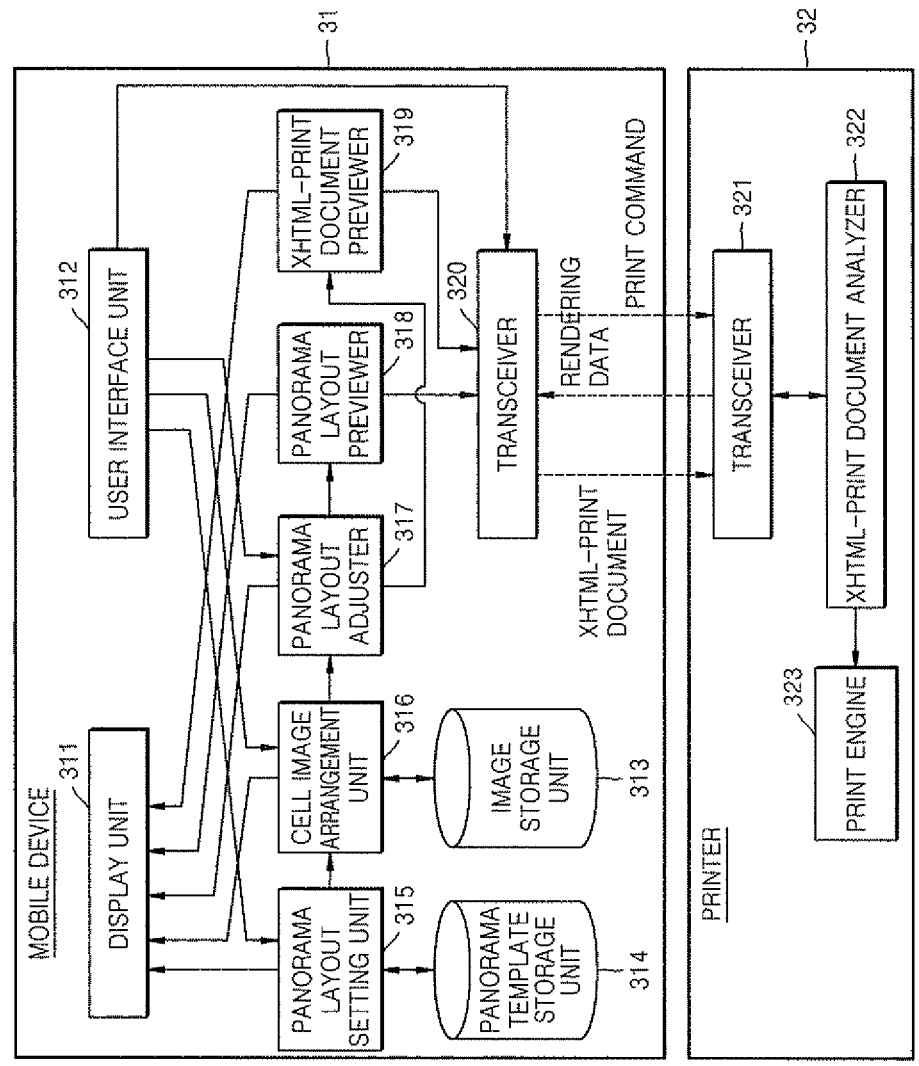
FIG. 3 is a block diagram of a panorama printing system according to an embodiment of the present invention.

FIG. 3 is a block diagram of a panorama printing system according to an embodiment of the present invention. As shown in FIG. 3, a panorama print requesting apparatus of a mobile device 31 includes a display unit 311, a user interface unit 312, a panorama template storage unit 314, an image storage unit 313, a panorama layout setting unit 315, a cell image arrangement unit 316, a panorama layout adjuster 317, a panorama layout previewer 318, an extensible hyper text markup language (XHTML)-Print document previewer 319, and a transceiver 320. The display unit 311 displays images related to a panoramic image, in which a plurality of consecutive images stored in the image storage unit 313 are united, to a user. The user interface unit 312 allows the user to input information regarding the panoramic image being created from the displayed images. The image storage unit 313 stores a plurality of consecutive images photographed by the user using the mobile device 31 and/or a plurality of consecutive images received from an external device (not shown). The panorama template storage unit 314 stores various panorama templates corresponding to layouts that may be set by the panorama layout setting unit 315. In particular, according an embodiment of the invention, the panorama template storage unit 314 stores panorama templates edited in a markup document format based on an XHTML-Print specification (Jan. 2006), the disclosure of which is incorporated by reference. Although the markup document described below is an XHTML-Print document, it will be understood by those of ordinary skill in the art that markup documents having other formats may be applied. While described in the context of a cell phone having an image capturing capability, it is understood that aspects of the invention can be implemented in a camera, media player, a portable computer and/or a non-portable computer.

Figure 4:
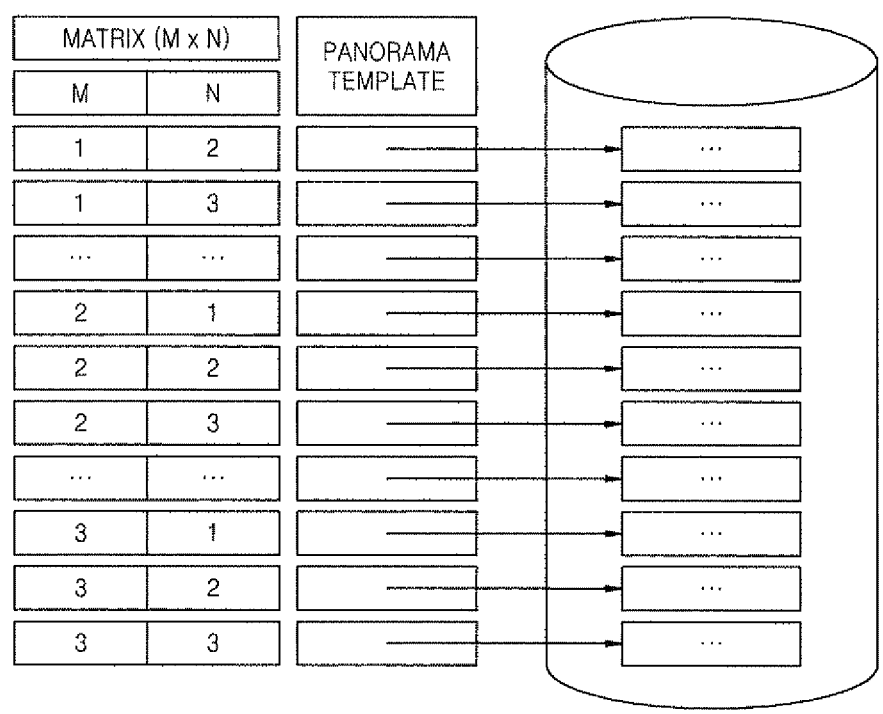
FIG. 4 illustrates a storage form of panorama templates according to an embodiment of the present invention.

FIG. 4 illustrates a storage form of panorama templates according to an embodiment of the present invention. As shown in FIG. 4, various panorama templates corresponding to cell image matrices (1, 2), (1, 3), ..., (3, 3) that may be set by the user are stored in the panorama template storage unit 314. The panorama templates may be edited as a style settable markup document, such as an XHTML-Print document.

With reference back to FIG. 3, the panorama layout setting unit 315 sets a basic layout of the panoramic image by selecting a panorama template corresponding to the basic layout from among the panorama templates stored in the panorama template storage unit 314 according to a first value input by the user through the user interface unit 312. In more detail, the panorama layout setting unit 315 sets a matrix of cell images that constitute the panoramic image by selecting a panorama template corresponding to the cell image matrix, i.e., a matrix having (M rows×N numbers of images per row) dimensions, from among the panorama templates according to a second input value. In addition, the panorama layout setting unit 315 sets a width and a height of a print medium on which the panoramic image is to be printed and a total width and a height of the panoramic image by writing the width and the height of the print medium and the total width and the height of the panoramic image in the panorama template.

The mobile device 31 may use static panorama templates stored in the panorama template storage unit 314, as described above. However, the mobile device 31 may also include a script module to allow for a creation of an XHTML-Print document instead of or in addition to the static panorama templates. In particular, in the former case, since the script module does not have to be included by the creation of an XHTML-Print document indicating a panoramic image from a panorama template, a panoramic image may be relatively easily created even in a mobile device having very low specification hardware.

The cell image arrangement unit 316 selects consecutive cell images that constitute the panoramic image from among the plurality of images stored in the image storage unit 313 according to a third value input by the user through the user interface unit 312. The cell image arrangement unit 316 further arranges the selected cell images according to the layout set by the panorama layout setting unit 315 (i.e., in cells of the matrix set by the panorama layout setting unit 315) by writing source information of the selected cell images in the panorama template selected by the panorama layout setting unit 315 according to a fourth input value. In addition, the cell image arrangement unit 316 creates an XHTML-Print document, in which only a basic size and locations of the cell images are set, by arranging the cell images.

The panorama layout adjuster 317 minutely adjusts the layout of the panoramic image including the cell images arranged by the cell image arrangement unit 316 by adjusting style attribute values of the panorama template selected by the panorama layout setting unit 315 according to a fifth value input by the user through the user interface unit 312. In addition, the panorama layout adjuster 317 creates an XHTML-Print document. Here, the XHTML-Print document includes the panoramic image, in which the images are united due to this adjustment. In more detail, when the user designates a block that corresponds to a new cell image by performing horizontal movement, vertical movement, zoom up/down, and/or clipping on an existing cell image using a mouse or similar device, the panorama layout adjuster 317 replaces the default style attribute values of the panorama template selected by the panorama layout setting unit 315 with a value indicating the block corresponding to the new cell image.

When the user performs a predetermined job through the user interface unit 312, as described above, the user may additionally perform a general arrangement using the similarity of adjacent areas provided by a technique such as artificial intelligence pattern recognition technology. The user may then perform detailed arrangement through the user interface unit 312.

Figure 5:
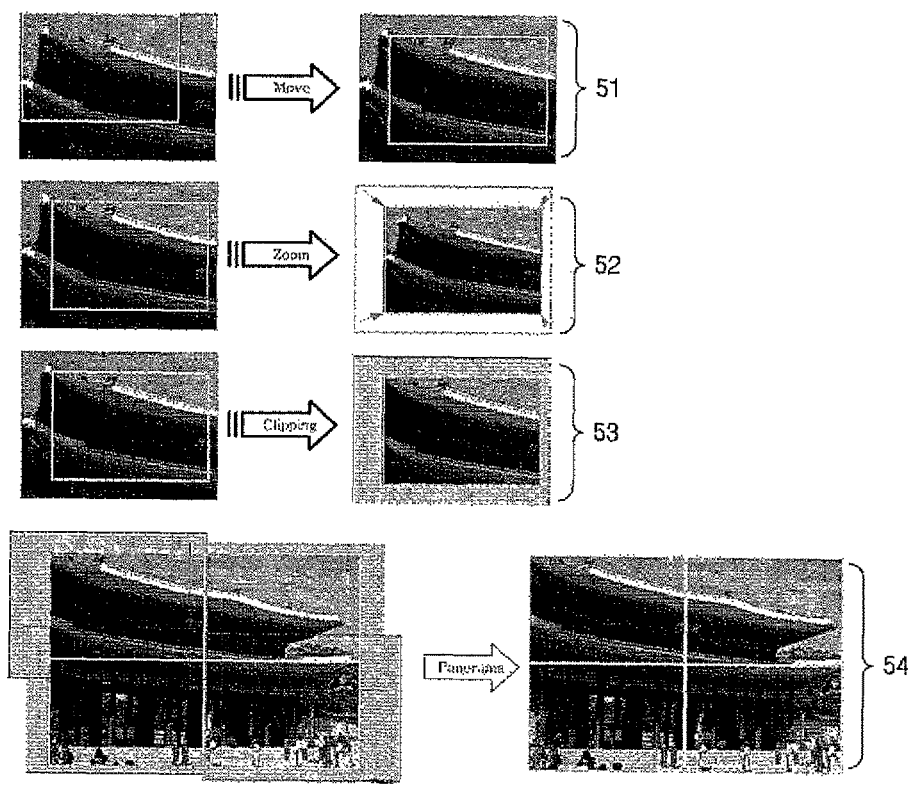
FIG. 5 illustrates a process of adjusting a panorama layout according to an embodiment of the present invention.

FIG. 5 illustrates a process of adjusting a panorama layout according to an embodiment of the present invention. As shown in FIG. 5, if horizontal/vertical movement of a block corresponding to a new cell image in a cell image that is arranged by the cell image arrangement unit 316 is necessary, attributes to describe the movement are used. These attributes may indicate a location (i.e., "left" or "top") from among XHTML-Print style attributes. That is, when the user designates a block corresponding to a new cell image by performing a horizontal and a vertical movement of the block corresponding to the new cell image in the cell image using a mouse or similar device, the panorama layout adjuster 317 writes (referring to image 51) a value corresponding to the horizontal/vertical movement on the "left" and "top" attributes of the XHTML-Print document.

If an up or down zoom is necessary for a cell image arranged by the cell image arrangement unit 316, attributes indicating a specific ratio (relative dimension) or a specific size (absolute dimension) (i.e., "width" or "height") from among the XHTML-Print style attributes may be used. That is, when the user designates a block corresponding to a new cell image by performing an up or down zoom of an existing cell image using a mouse or similar device, the panorama layout adjuster 317 writes (referring to image 52) a value corresponding to the up or down zoom on the "width" and "height" attributes of the XHTML-Print document.

If clipping is necessary for a cell image arranged by the cell image arrangement unit 316, an attribute indicating that some part is hidden (i.e., "overflow:hidden") from among the XHTML-Print style attributes are used. That is, when the user designates a block corresponding to a new cell image by clipping an existing cell image using a mouse or similar device, the panorama layout adjuster 317 writes (referring to image 53) a block size corresponding to the new cell image on the "width" and "height" attributes of the XHTML-Print document and writes "overflow:hidden" to clip the other area.

As is described above, the panorama layout adjuster 317 creates (referring to image 54) an XHTML-Print document indicating the panoramic image illustrated in FIG. 5 by properly adjusting the XHTML-Print style attributes.

FIG. 6 illustrates an XHTML-Print document according to an embodiment of the present invention. As shown in FIG. 6, in the XHTML-Print document illustrated in FIG. 6, style attribute values on a 2×2 panorama template (such as that shown in FIG. 5) selected by the panorama template storage unit 314 and source image information are written.

Referring back to FIG. 3, the panorama layout previewer 318 provides a preview of the layout of the panoramic image to the user by outputting the layout of the panoramic image having been minutely adjusted by the panorama layout setting unit 315 to the display unit 311. After recognizing the preview of the layout of the panoramic image displayed by the display unit 311, the user may perform horizontal movement, vertical movement, zoom up or down, and/or clipping on a cell image again using a mouse or a similar device. This process is iterated until a panoramic image of a level desired by the user is edited. That is, the panorama layout adjuster 317 minutely adjusts the layout of the panoramic image again according to the fifth input value input through the user interface unit 312 by the user who has viewed the preview provided by the panorama layout previewer 318.

However, to output the layout of the panoramic image to the display unit 311, as described above, a process of analyzing the XHTML-Print document having the style attribute values written by the panorama layout setting unit 315 is required. Thus, the panorama layout previewer 318 may include this analysis function. Alternately, the mobile device may request that a printer 32 perform the analysis of the XHTML-Print document be performed. If the analysis is performed at a printer, or at a receiving device connected to a printer, it is understood the previewer 318 need not have this functionality.

When the layout of the panoramic image is adjusted by the panorama layout adjuster 317 to the user desired level, the XHTML-Print document previewer 319 requests an analysis of the XHTML-Print document by transmitting the XHTML-Print document having the style attribute values written by the panorama layout setting unit 315 to the printer 32 through the transceiver 320. In addition, the XHTML-Print document previewer 319 provides a preview of a panoramic image to be printed by the printer 32 to the user. This is accomplished by receiving rendering data of the XHTML-Print document in response to the request, and then, by outputting the received rendering data to the display unit 311. As is described above, by using an XHTML-Print document analysis function of the printer 32, a preview of a panoramic image may be realized even in a mobile device 31 having very low specification hardware.

According to an embodiment of the invention, the analysis of an XHTML-Print document indicates all processes concerned with parsing and rendering the XHTML-Print document. Rendering data of the XHTML-Print document indicates data output by passing through all these processes (i.e., RGB data, which can be directly printed or displayed by printers or display units, respectively).

As in the preview of the layout of the panoramic image, in the preview of the panoramic image to be printed, after the preview of a layout of the panoramic image displayed by the display unit 311 is recognized, the user may also perform horizontal movement, vertical movement, zoom up or down, and/or clipping on a cell image again using a mouse or similar device. That is, the panorama layout adjuster 317 minutely adjusts the layout of the panoramic image again according to the fourth input value input through the user interface unit 312 by the user who has viewed the preview provided by the XHTML-Print document previewer 319.

The transceiver 320 transmits the XHTML-Print document having the style attribute values written by the panorama layout setting unit 315 to the printer 32 according to a request of the XHTML-Print document previewer 319. Alternately, the transceiver 320 may receive output rendering data of the XHTML-Print document in response to the request and then, output the received rendering data to the XHTML-Print document previewer 319. In addition, if the user issues a print command through the user interface unit 312, the transceiver 320 transmits the print command to the printer 32. In particular, it will be understood by those of ordinary skill in the art that the transceiver 320 performs transmission and reception using various communication media including wireless communication media, such as infrared communication, Bluetooth communication, IEEE 802.11 wireless local area network (WLAN) communication, and so on, and wired communication media.

A panorama printing apparatus included in the printer 32 includes a transceiver 321, an XHTML-Print document analyzer 322, and a print engine 323. The transceiver 321 receives an XHTML-Print document from the mobile device 31. In addition, the transceiver 321 transmits rendering data of the XHTML-Print document, which is an analysis result by the XHTML-Print document analyzer 322, to the mobile device 31. In addition, the transceiver 321 receives a print command from the mobile device 31. The XHTML-Print document analyzer 322 analyzes the XHTML-Print document received from the mobile device 31 through the transceiver 321. In particular, the XHTML-Print document analyzer 322 receives an analysis request of the XHTML-Print document by receiving the XHTML-Print document from the mobile device 31 through the transceiver 321. The XHTML-Print document analyzer 322, which has received the analysis request, analyzes the XHTML-Print document and transmits rendering data of the XHTML-Print document to the mobile device 31 through the transceiver 321 as a response of the analysis request. However, if the mobile device 31 includes a module to perform a function of the XHTML-Print document analyzer 322, the printer 32 may not have to include the XHTML-Print document analyzer 322. When a print command is received through the transceiver 321, the print engine 323 prints the rendering data of the XHTML-Print document, which is an analysis result by the XHTML-Print document analyzer 322, on a print medium. While not required in all aspects, the printer 32 need not include the print engine 323, such as where the printer 32 stores and/or provides the panorama print to an external printer.

Figure 7:
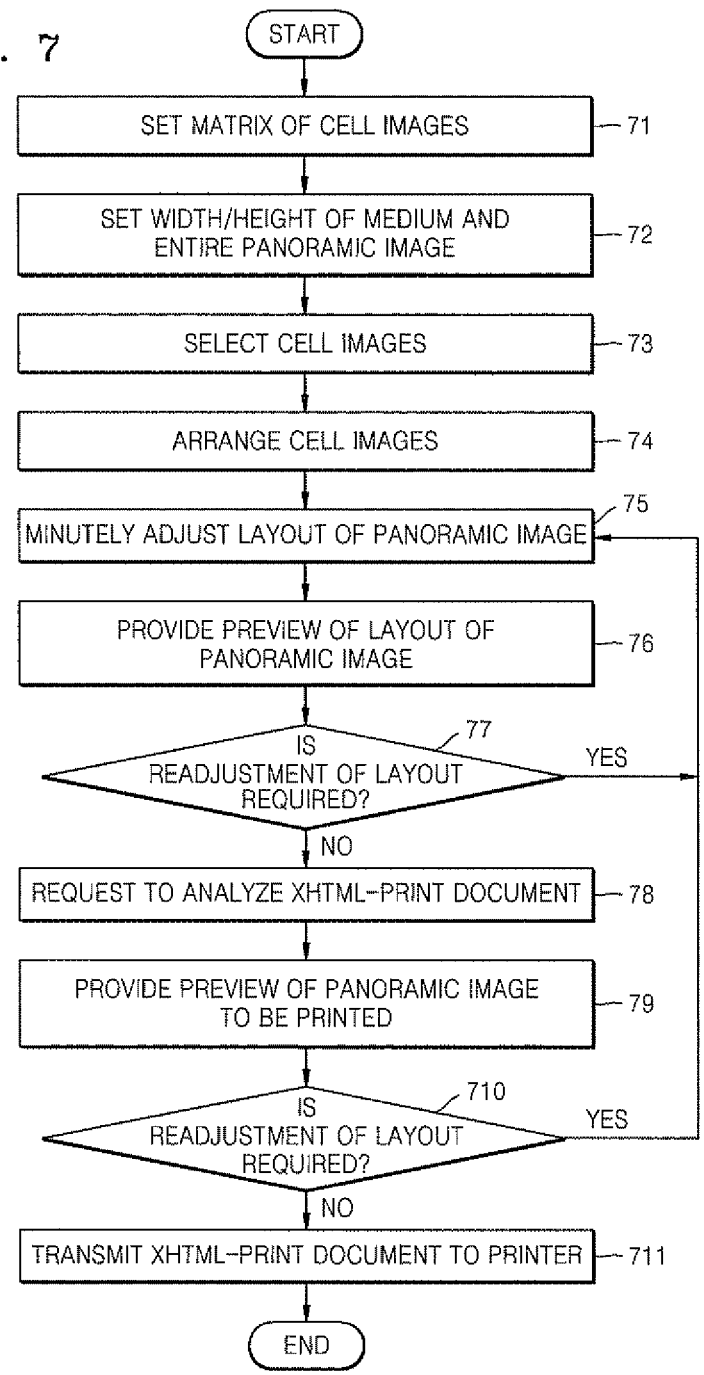
FIG. 7 is a flowchart illustrating a panorama print requesting method according to an embodiment of the present invention.

FIG. 7 is a flowchart illustrating a panorama print requesting method according to an embodiment of the present invention. As shown in FIG. 7, the panorama print requesting method comprises operations that are processed sequentially by the mobile device 31 of FIG. 3. Thus, although descriptions may be omitted in the current embodiment, the descriptions of the mobile device 31 illustrated in FIG. 3 are also applied to the panorama print requesting method according to the current embodiment.

In operation 71, the mobile device 31 sets a matrix of cell images that constitute a panoramic image by selecting a panorama template corresponding to the matrix of cell images from among panorama templates stored in the panorama template storage unit 314 according to a first value input by the user through the user interface unit 312. In operation 72, the mobile device 31 sets a width and/or height of a print medium on which the panoramic image is to be printed and a total width and/or height of the panoramic image by writing the width and/or the height of the print medium on which the panoramic image is to be printed and the total width and/or the height of the panoramic image in the panorama template selected in operation 71 according to a second value input by the user through the user interface unit 312. In operation 73, the mobile device 31 selects consecutive cell images that constitute the panoramic image from among a plurality of images stored in the image storage unit 313 according to a third value input by the user through the user interface unit 312. In operation 74, the mobile device 31 arranges the cell images selected in operation 73 in cells of the matrix that is set in operation 71 by writing source information of the cell images selected in operation 73 in the panorama template selected in operation 71 according to a fourth value input by the user through the user interface unit 312. In operation 75, the mobile device 31 minutely adjusts a layout of a panoramic image that includes the images arranged by the cell image arrangement unit 316 by adjusting style attribute values of the panorama template selected in operation 71 according to a fifth value input by the user through the user interface unit 312 and creates an XHTML-Print document indicating the panoramic image in which the plurality of images are united due to this adjustment. While not required, it is understood that other indicia, such as text, can be included in the template and the document.

In operation 76, the mobile device 31 provides a preview of the layout of the panoramic image to the user by outputting the layout of the panoramic image that has been minutely adjusted in operation 75 to the display unit 311. In operation 77, if the user indicates through the user interface unit 312 that a readjustment of the layout of the panoramic image is necessary (yes), the mobile device 31 proceeds to operation 75. If no such indication exists (no), the mobile device 31 proceeds to operation 78.

In operation 78, the mobile device 31 requests that the XHTML-Print document be analyzed by transmitting the XHTML-Print document having the style attribute values adjusted in operation 75 to operation 81 of FIG. 8 to be described later. In operation 79, the mobile device 31 receives rendering data of the XHTML-Print document in response to the request of operation 78 from operation 83 of FIG. 8 and provides a preview of a panoramic image to be printed to the user by outputting the rendering data to the display unit 311.

In operation 710, the user who has viewed the preview provided in operation 79 indicates that a readjustment of the layout of the panoramic image is necessary (yes), the mobile device 31 proceeds to operation 75. If the user indicates that no such readjustment is necessary, the mobile device 31 proceeds to operation 711. In operation 711, if the value input by the user through the user interface unit 312 indicates a print command, the mobile device 31 transmits the XHTML-Print document having the style attribute values adjusted in operation 75 to operation 84 of FIG. 8 which will be described below.

Figure 8:
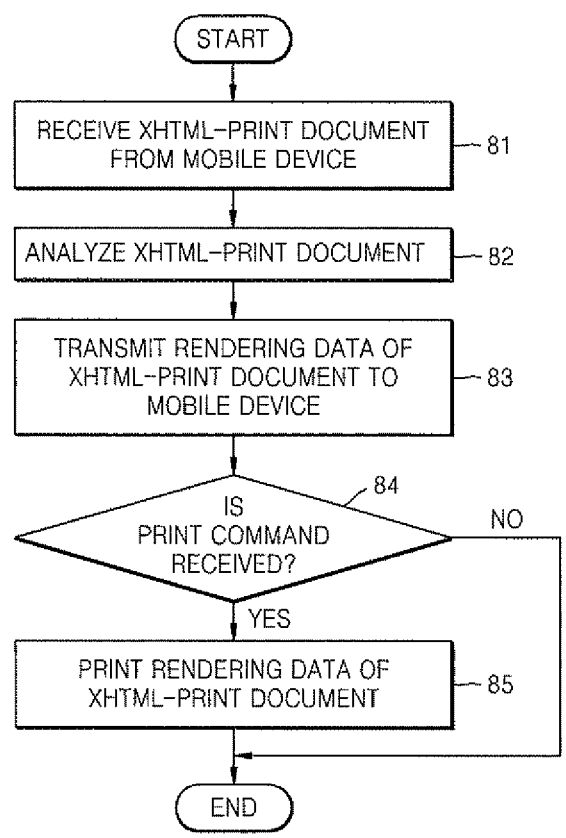
FIG. 8 is a flowchart illustrating a panorama printing method according to an embodiment of the present invention.

FIG. 8 is a flowchart illustrating a panorama printing method according to an embodiment of the present invention. As shown in FIG. 8, the panorama printing method comprises operations that are sequentially processed by the printer 32 of FIG. 3. Thus, although descriptions may be omitted in the current embodiment, the descriptions of the printer 32 illustrated in FIG. 3 are also applied to the panorama printing method according to the current embodiment.

In operation 81, the printer 32 receives a request to analyze an XHTML-Print document by receiving the XHTML-Print document from operation 78 of FIG. 7. In operation 82, the printer 32 analyzes the XHTML-Print document received in operation 81. In operation 83, the printer 32 transmits rendering data of the XHTML-Print document, which is generated as a result of the analysis performed in operation 82, to operation 79 of FIG. 7 through the transceiver 321 in response to the request. If a print command is found to have been received from operation 711 of FIG. 7, in operation 84 (yes), the printer 32 proceeds to operation 85. If a print command is found not to have been received (no), the printer 32 ends this process. In operation 85, the printer 32 prints the rendering data of the XHTML-Print document, which is a result of the analysis performed in operation 82, on a print medium.

Figure 9:
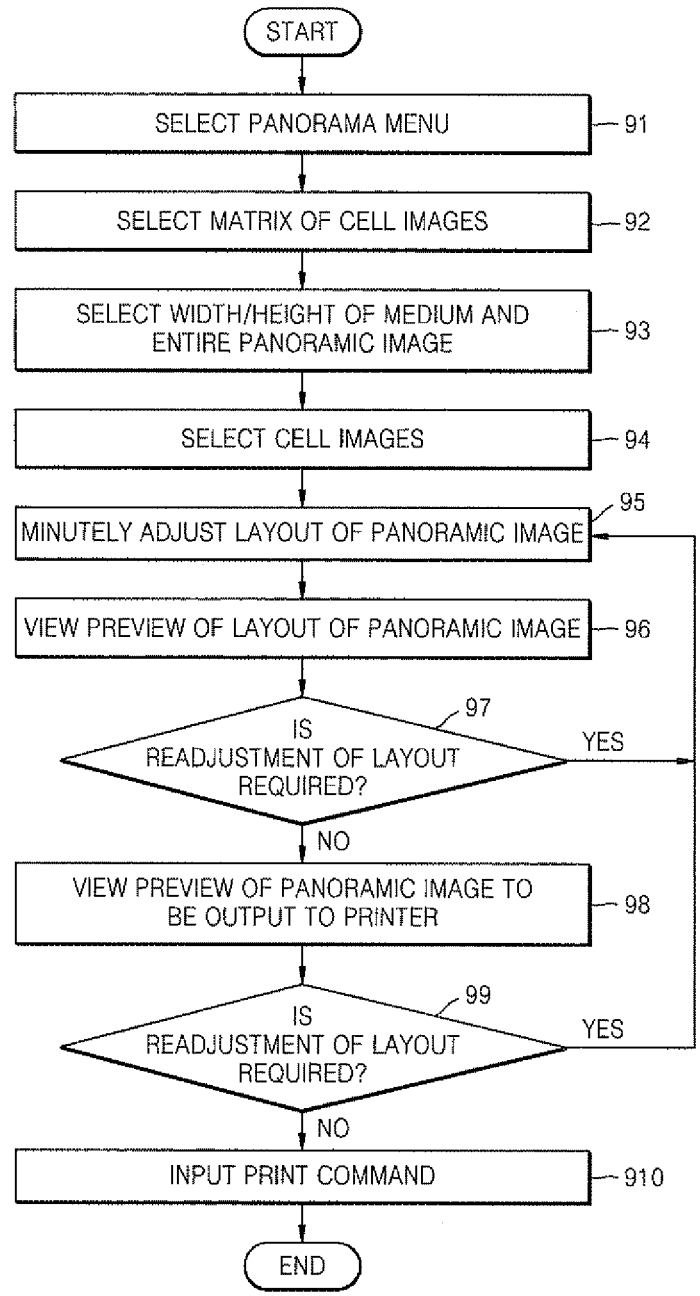
FIG. 9 is a flowchart illustrating a user input process to a mobile device according to an embodiment of the present invention.

FIG. 9 is a flowchart illustrating a user input process to the mobile device 31 according to an embodiment of the present invention. In operation 91, a user selects a panorama menu from a display window displayed by the display unit 311 by a first operation of the user interface unit 312. In operation 92, the user selects a matrix of cell images that constitute a panoramic image from a display window displayed by the display unit 311 by a second operation of the user interface unit 312. In operation 93, the user selects a width and/or a height of a print medium on which the panoramic image is to be printed and a total width and/or a height of the panoramic image from a display window, which is displayed by the display unit 311, by a third operation of the user interface unit 312. In operation 94, the user sequentially selects cell images corresponding to cells of the matrix selected in operation 92 from a display window, which is displayed by the display unit 311, by a fourth operation of the user interface unit 312. In operation 95, the user minutely adjusts a layout of the panoramic image constituted of the cell images selected in operation 94 from a display window, which is displayed by the display unit 311, by a fifth operation of the user interface unit 312.

In operation 96, the user views a preview of the layout of the panoramic image minutely adjusted in operation 95 from the display window displayed by the display unit 311. In operation 97, if readjustment of the layout of the panoramic image is found to be required, the user proceeds to operation 95 by an operation of the user interface unit 312, and if the user determines that the layout of the panoramic image has been adjusted to a desired level, the user proceeds to operation 98. In operation 98, the user views a preview of a panoramic image, to be printed by the printer 32, in the display window displayed by the display unit 311. In operation 99, if readjustment of the layout of the panoramic image is required, the user proceeds to operation 95 by an operation of the user interface unit 312, and if the user determines that the layout of the panoramic image has been adjusted to a desired level, the user proceeds to operation 910. In operation 910, the user inputs a print command by an operation of the user interface unit 312.

The embodiments of the present invention may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

As is described above, according to aspects of the present invention, a mobile device creates an XHTML-Print document indicating a panoramic image in which a plurality of images are united and transmits the created XHTML-Print document to a printer. The printer, which has received the XHTML-Print document, analyzes and prints the XHTML-Print document Thus, by presenting a panoramic image using style attributes of an XHTML-Print document, which do not require a large memory resource or a complicated application, the panoramic image can be easily created even in a mobile device having an insufficient memory resource and low specification hardware.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A print requesting method comprising:
   selecting a panorama template that corresponds to a layout of one cell image matrix, from among a plurality of panorama templates corresponding to different layouts of a plurality of cell image matrices for one panorama image;
   arranges a plurality of images according to the layout of the selected panorama template;
   adjusting style attribute values of the selected panorama template;
   creating a markup document defining a panoramic image in which the images are united due to the adjusting;
   requesting that the panoramic image be printed, by transmitting using a transceiver, the created markup document; and wherein the plurality of images make up a matrix having M×N images therein, where M is a number of rows and N is a number of images per row.

2. The print requesting method of claim 1, wherein the adjusting comprises adjusting style attribute values of the panorama template into which the images are inserted.

3. The print requesting method of claim 1, further comprising providing a preview of the created panoramic image to a user.

4. The print requesting method of claim 3, wherein the creating comprises:
   displaying the provided preview of the panoramic image to the user;
   adjusting a layout of the panoramic image according to a value input by the user;
   and creating the markup document based on the adjustment.

5. The print requesting method of claim 3, wherein the providing comprises: requesting an analysis of the markup document by a transmission of the markup document to a printer;
   receiving rendering data of the markup document in response to the request; and
   displaying the rendering data.

6. The print requesting method of claim 1, further comprising setting a layout of the panoramic image, wherein, during the creating, the set layout is adjusted, and the markup document is created based on the adjustment.

7. The print requesting method of claim 6, wherein the setting comprises setting the layout of the panoramic image by a selection of a panorama template.

8. The print requesting method of claim 6, wherein the creating comprises adjusting the set layout of the panoramic image by adjusting style attribute values of the selected panorama template.

9. The print requesting method of claim 7, wherein the creating comprises adjusting the set layout of the panoramic image by adjusting style attribute values of the selected panorama template.

10. The print requesting method of claim 6, further comprising arranging the images according to the set layout, wherein the creating comprises adjusting the layout of the panoramic image having the arranged images.

11. The print requesting method of claim 1, wherein the creating comprises creating the markup document according to a value input by the user.

12. The print requesting method of claim 1, wherein the creating comprises creating the markup document by adjusting style attribute values of a panorama template edited in a markup document format based on an XHTML-Print specification.

13. A non-transitory computer readable recording medium having a computer readable program to execute a print requesting method stored thereon to be performed by a computer, the method comprising:
   selecting a panorama template that corresponds to a layout of one cell image matrix, from among a plurality of panorama templates corresponding to different layouts of a plurality of cell image matrices for one panorama image;
   arranging a plurality of images according to the layout of the selected panorama template;
   adjusting style attribute values of the selected panorama template;
   creating a markup document defining a panoramic image in which the images are united due to the adjusting;
   requesting that the panoramic image be printed, by transmitting the created markup document;
   and wherein the plurality of images make up a matrix having M×N images therein, where M is a number of rows and N is a number of images per row.

14. A print requesting apparatus comprising: a selector to selecting a panorama template that corresponds to a layout of one cell image matrix, from among a plurality of panorama templates corresponding to different layouts of a plurality of cell image matrices for one panorama image;
   an arranger to arrange a plurality of images according to the layout of the selected panorama template;
   an adjuster to adjust style attribute values of the selected panorama template and create a markup document defining a panoramic image by adjusting a layout of the panoramic image, the panoramic image including a plurality of images that are united due to the adjusting;

a transmitter to request that the panoramic image be printed, by transmitting the markup document;

and wherein the plurality of images make up a matrix having M×N images therein, where M is a number of rows and N is a number of images per row.

15. A printing method comprising: receiving by using a receiver a markup document indicating a panoramic image in which a plurality of images are united due to an adjusting of style attribute values of a panorama template corresponding to a basic layout;

analyzing the received markup document;

printing a result of the analysis;

wherein the panoramic image includes the plurality of images arranged according to the layout of one cell image matrix of the panorama template selected from among a plurality of panorama templates corresponding to different layouts of a plurality of cell image matrices for one panorama image;

and wherein the plurality of images make up a matrix having M×N images therein, where M is a number of rows and N is a number of images per row.

16. The printing method of claim 15, wherein the receiving comprises: receiving a request for the analysis of a markup document by receiving the markup document; and transmitting an analysis result as a response to the request.

17. The printing method of claim 15, wherein the markup document comprises an extensible hyper text markup language (XHTML)-Print document.

18. A non-transitory computer readable recording medium having a computer readable program to execute a printing method stored thereon to be performed by a computer, the method comprising:

receiving a markup document indicating a panoramic image in which a plurality of images are united due to an adjusting of style attribute values of a panorama template corresponding to a basic layout;

analyzing the received markup document;

printing a result of the analysis;

wherein the panoramic image includes the plurality of images arranged according to the layout of one cell image matrix of the panorama template selected from among a plurality of panorama templates corresponding to different layouts of a plurality of cell image matrices for one panorama image;

and wherein the plurality of images make up a matrix having M×N images therein, where M is a number of rows and N is a number of images per row.

19. A printing apparatus comprising: a receiver to receive a markup document indicating a panoramic image in which a plurality of images are united due to an adjusting of style attribute values of a panorama template corresponding to a basic layout;

an analyzer to analyze the received markup document;

a print engine to print a result of the analysis;

wherein the panoramic image includes the plurality of images arranged according to the layout of one cell image matrix of the panorama template selected from among a plurality of panorama templates corresponding to different layouts of a plurality of cell image matrices for one panorama image;

and wherein the plurality of images make up a matrix having M×N images therein, where M is a number of rows and N is a number of images per row.

20. A print requesting apparatus of a mobile device to allow a panoramic image, which includes images to be printed, comprising:

a panorama layout setting unit to set a layout of the panoramic image according to an input by selecting one of a plurality of stored panorama templates corresponding to a layout of one cell image matrix, from among a plurality of panorama templates corresponding to different layouts of a plurality of cell image matrices for one panorama image, based on the input;

a cell image arrangement unit to arrange the images according to the set layout;

a panorama layout adjuster to adjust the set layout including arranged images by adjusting predetermined style attribute values of the selected panorama template;

a previewer to preview the panoramic image and to receive inputs for additional adjustments;

a transceiver to transmit data corresponding to the adjusted panoramic image to an image forming apparatus;

and wherein the plurality of images make up a matrix having M×N images therein, where M is a number of rows and N is a number of images per row.

21. The print requesting apparatus according to claim 20, wherein the storage unit stores panorama templates edited in a markup document format based on an XHTML-Print specification.

22. The print requesting apparatus according to claim 20, wherein the storage unit stores static panorama templates to be selected by the panorama layout setting unit.

23. The print requesting apparatus according to claim 20, further comprising a script module to allow for a creation of an XHTML-Print document to create the one panorama template.

24. The print requesting apparatus according to claim 20, wherein the cell arrangement unit selects the images that constitute the panoramic image from among the stored images according to a user input.

25. The print requesting apparatus according to claim 20, wherein the panorama layout adjuster creates an XHTML-Print document, including the panoramic image.

26. The print requesting apparatus according to claim 20, wherein the mobile device comprises a camera to capture the images.

27. An image forming apparatus to receive the transmitted data from the transceiver of the print requesting apparatus of claim 20 and to analyze the received transmitted data.

* * * * *